(12) United States Patent
Kawamoto (10) Patent No.: US 9,100,239 B2
(45) Date of Patent: Aug. 4, 2015

(54) INFORMATION PROCESSING SYSTEM, PORTABLE INFORMATION PROCESSING APPARATUS, AND INFORMATION PROCESSING METHOD

(71) Applicant: FUJI XEROX CO., LTD., Minato-ku, Tokyo (JP)

(72) Inventor: Shintaro Kawamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 264 days.

(21) Appl. No.: 13/896,693

(22) Filed: May 17, 2013

(65) Prior Publication Data

US 2014/0129619 A1 May 8, 2014

(30) Foreign Application Priority Data

Nov. 5, 2012 (JP) ................................. 2012-243765

(51) Int. Cl.
| | |
|---|---|
| G06F 15/173 | (2006.01) |
| H04L 29/06 | (2006.01) |
| G06Q 10/06 | (2012.01) |
| G06Q 10/10 | (2012.01) |
| H04L 29/08 | (2006.01) |

(52) U.S. Cl.
CPC .......... *H04L 29/06047* (2013.01); *G06Q 10/06* (2013.01); *G06Q 10/10* (2013.01); *H04L 29/06* (2013.01); *H04L 29/08072* (2013.01)

(58) Field of Classification Search
CPC .......................... H04L 29/06; H04L 29/08072
USPC ........... 709/203, 224, 227; 455/414.3; 726/26
See application file for complete search history.

(56) References Cited

U.S. PATENT DOCUMENTS

| | | | | |
|---|---|---|---|---|
| 8,832,850 | B2* | 9/2014 | Sotos et al. ...................... 726/26 |
| 8,886,172 | B2* | 11/2014 | Gomez ....................... 455/414.3 |
| 8,909,194 | B2* | 12/2014 | Madhavan et al. ............ 455/411 |
| 2013/0326607 | A1* | 12/2013 | Feng .................................. 726/7 |
| 2014/0304775 | A1* | 10/2014 | Kumar ............................... 726/3 |

FOREIGN PATENT DOCUMENTS

| | | |
|---|---|---|
| EP | 1 191 461 A1 | 3/2002 |
| JP | 10-254982 A | 9/1998 |
| JP | 2000-339276 A | 12/2000 |
| JP | 2010-26546 A | 2/2010 |

* cited by examiner

*Primary Examiner* — Khanh Dinh
(74) *Attorney, Agent, or Firm* — Sughrue Mion, PLLC (57) ABSTRACT

An information processing system includes a first information processor and a second portable information processor connected via a network. The first processor includes a first receiver receiving client identification information and a document template type from the second processor, and a first transmitter transmitting client-related information and a document template to the second processor. The second processor includes a current-position acquisition unit, a determiner determining a first client to be visited, a second transmitter transmitting first-client identification information and the document template type to the first processor, a second receiver receiving first-client-related information and/or a document template from the first processor, a document-template storage unit, a creation unit creating a document based on the document template and the first-client-related information, and a deletion unit deleting the first-client-related information and the document when the current position is distant from the first client or when a second client is determined.

3 Claims, 8 Drawing Sheets

| CLIENT ID 410 | CLIENT NAME 420 | ADDRESS 430 | COORDINATES 440 | COMPENSATION 450 |
|---|---|---|---|---|
| C0001 | COMPANY A | ADDRESS A | (LATITUDE A, LONGITUDE A, ALTITUDE A) | (A1', A2', A3') |
| C0002 | COMPANY B | ADDRESS B | (LATITUDE B, LONGITUDE B, ALTITUDE B) | (B1', B2', B3') |
| C0003 | COMPANY C | ADDRESS C | (LATITUDE C, LONGITUDE C, ALTITUDE C) | (C1', C2', C3') |
| C0004 | COMPANY D | ADDRESS D | (LATITUDE D, LONGITUDE D, ALTITUDE D) | (D1', D2', D3') |

| USER | START TIME | FINISH TIME | CLIENT ID |
|---|---|---|---|
| UserX | 02/01/2012 10:00 | 02/01/2012 11:00 | C0001 |
| UserX | 02/01/2012 12:00 | 02/01/2012 14:00 | C0002 |
| UserX | 02/01/2012 16:00 | 02/01/2012 18:00 | C0003 |
| UserX | 02/02/2012 10:00 | 02/02/2012 12:00 | C0001 |
| UserX | 02/02/2012 14:00 | 02/02/2012 16:00 | C0004 |

FIG. 6

| TEMPLATE ID | TEMPLATE NAME | CLIENT ID |
|---|---|---|
| T0001 | PRODUCT DESCRIPTION T | C0001, C0002 |
| T0002 | PRODUCT DESCRIPTION S | C0003 |
| T0003 | PRODUCT DESCRIPTION U | C0002, C0004 |

FIG. 7

| ATTRIBUTE SET ID | TEMPLATE ID | CLIENT ID |
|---|---|---|
| A0001 | T0001 | C0001 |
| A0002 | T0001 | C0002 |
| A0003 | T0002 | C0003 |
| A0004 | T0003 | C0002 |
| A0005 | T0003 | C0004 |

| 910 | 920 | 930 | |
|---|---|---|---|
| CLIENT ID | COORDINATES | COMPENSATION | 900 |
| C0001 | (LATITUDE A, LONGITUDE A, ALTITUDE A) | (A1', A2', A3') | |
| C0002 | (LATITUDE B, LONGITUDE B, ALTITUDE B) | (B1', B2', B3') | |
| C0003 | (LATITUDE C, LONGITUDE C, ALTITUDE C) | (C1', C2', C3') | |

FIG. 10

| 1010 | 1020 | 1030 | 1040 | |
|---|---|---|---|---|
| USER | START TIME | FINISH TIME | CLIENT ID | 1000 |
| UserX | 02/01/2012 10:00 | 02/01/2012 11:00 | C0001 | |
| UserX | 02/01/2012 12:00 | 02/01/2012 14:00 | C0002 | |
| UserX | 02/01/2012 16:00 | 02/01/2012 18:00 | C0003 | |

FIG. 11

| 1110 | 1120 | |
|---|---|---|
| UPDATE TIME | TEMPLATE ID | 1100 |
| 02/01/2012 10:00 | T0001 | |

FIG. 12

| ATTRIBUTE SET ID | TEMPLATE ID | CLIENT ID |
|---|---|---|
| A0001 | T0001 | C0001 |

| UPDATE TIME | TEMPLATE ID |
|---|---|
| 02/01/2012 12:00 | T0001 |
| 02/01/2012 14:10 | T0003 |

| ATTRIBUTE SET ID | TEMPLATE ID | CLIENT ID |
|---|---|---|
| A0002 | T0001 | C0002 |
| A0004 | T0003 | C0002 |

| UPDATE TIME | TEMPLATE ID |
|---|---|
| 02/01/2012 12:00 | T0001 |
| 02/01/2012 14:10 | T0003 |
| 02/01/2012 16:00 | T0002 |

| ATTRIBUTE SET ID | TEMPLATE ID | CLIENT ID |
|---|---|---|
| A0003 | T0002 | C0003 |

INFORMATION PROCESSING SYSTEM, PORTABLE INFORMATION PROCESSING APPARATUS, AND INFORMATION PROCESSING METHOD

CROSS-REFERENCE TO RELATED APPLICATIONS

This application is based on and claims priority under 35 USC 119 from Japanese Patent Application No. 2012-243765 filed Nov. 5, 2012.

BACKGROUND

Technical Field

The present invention relates to information processing systems, portable information processing apparatuses, and information processing methods.

SUMMARY

According to an aspect of the invention, there is provided an information processing system including an information processing apparatus and a portable information processing apparatus that are connected via a network. The information processing apparatus includes a first reception unit that receives, from the portable information processing apparatus, client identification information and a type of document template stored in a storage device within the portable information processing apparatus; and a first transmission unit that transmits client-related information and a document template to the portable information processing apparatus if the type of document template corresponding to the client identification information is not stored in the storage device within the portable information processing apparatus, or transmits the client-related information to the portable information processing apparatus if the type of document template corresponding to the client identification information is stored in the storage device within the portable information processing apparatus. The portable information processing apparatus includes an acquisition unit that acquires a current position of the portable information processing apparatus; a determination unit that determines a first client to be visited and located within a predetermined distance from the current position acquired by the acquisition unit; a second transmission unit that transmits, to the information processing apparatus, information for identifying the first client determined by the determination unit and the type of document template stored in the storage device within the portable information processing apparatus; a second reception unit that receives information related to the first client from the information processing apparatus or the information related to the first client and a document template corresponding to the first client from the information processing apparatus in accordance with the transmission by the second transmission unit; a storage unit that stores the document template into the storage device if the document template is received by the second reception unit; a creation unit that creates a document based on the document template corresponding to the first client within the storage device and the information related to the first client received by the second reception unit; and a deletion unit that deletes the information related to the first client and the created document when the current position acquired by the acquisition unit is distant from a position of the first client by a predetermined distance or greater or when a second client to be visited, which is different from the first client, and located within a predetermined distance from the current position acquired by the acquisition unit is determined.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the drawings.

Figure 1:
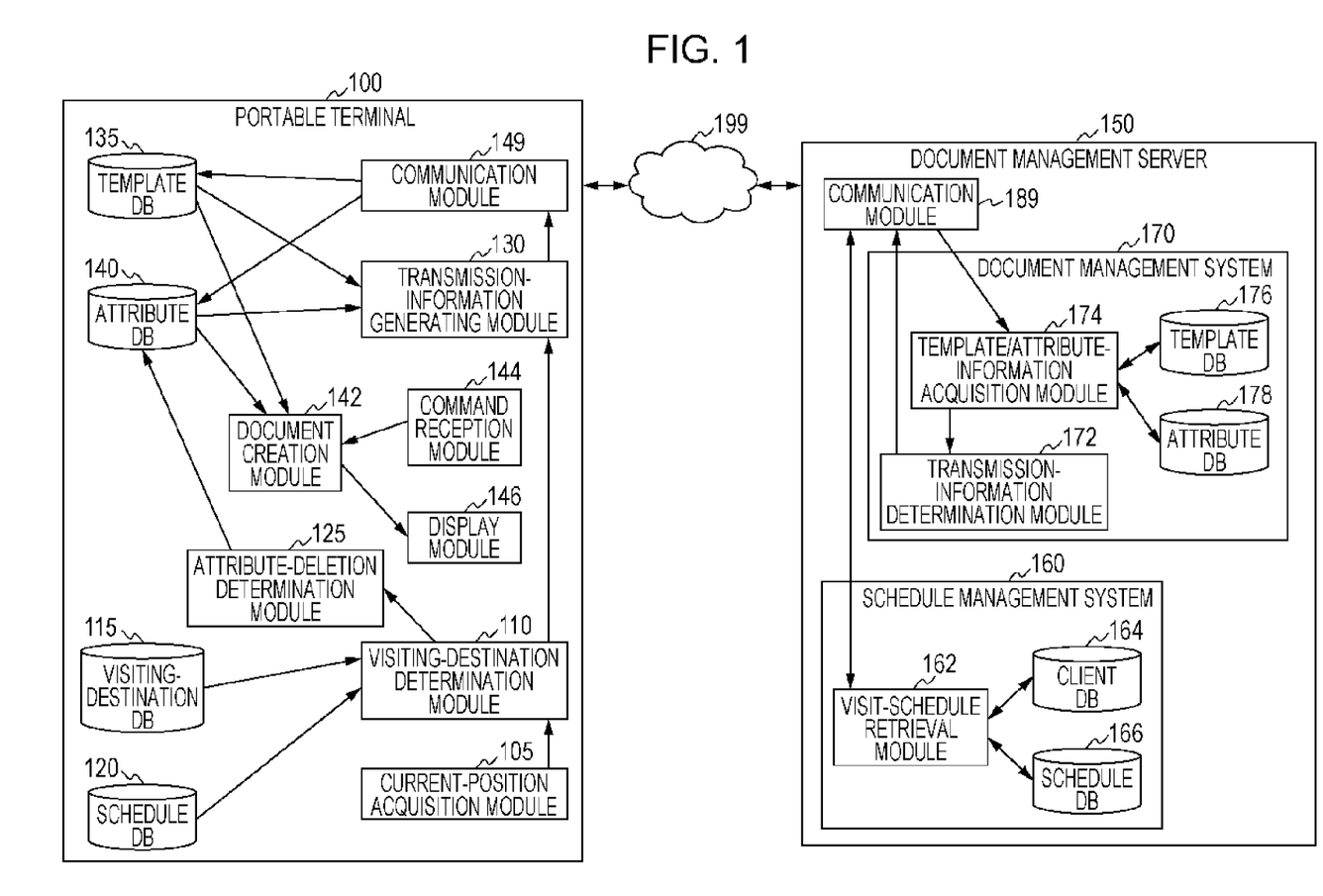
FIG. 1 is a module configuration diagram schematically illustrating a configuration example according to an exemplary embodiment.

FIG. 1 is a module configuration diagram schematically illustrating a configuration example according to the exemplary embodiment.

The term "module" generally refers to a logically separable component, such as software (computer program) or hardware. Therefore, each module in the exemplary embodiment not only refers to a module in a computer program, but also to a module in a hardware configuration. Accordingly, the exemplary embodiment is directed to a description of a computer program for causing a computer to function as each module (i.e., a program for causing the computer to execute each procedure, a program for causing the computer to function as each unit, and a program for causing the computer to achieve each function), as well as to a system and a method. Although the expressions "store data", "make a device store data", and expressions equivalent to these expressions are used for the sake of convenience, these expressions have a meaning of making a storage device store data or performing control to make the storage device store data if the exemplary embodiment corresponds to a computer program. The modules may correspond to the respective functions in a one-to-one fashion, but in actual implementation, each module may be constituted of a single program, multiple modules may be constituted of a single program, or each module may be constituted of multiple programs. Furthermore, multiple modules may be implemented by a single computer, or a single module may be implemented by multiple computers in a distributed or parallel environment. Moreover, a single module may include another module. The term "connection" used hereinafter refers not only to a physical connection, but also to a logical connection (i.e., exchanging of data, transmission of a command, or a reference relationship between data). The term "predetermined" refers to a state in which a value is preset before intended processing is to be performed, and includes not only a case where a value is preset prior to commencement of processing according to the exemplary embodiment, but also a case where a value is preset at a time point prior to the intended processing even when the processing according to the exemplary embodiment has already commenced, depending on the current condition or status or the previous condition or status. If there are multiple "predetermined values", the values may be different from each other, or two or more values (including all of the values) may be the same. Furthermore, the expression "in the case of A, B is performed" is used to indicate that "a process for determining A is performed, and if the determination result indicates A, B is performed". However, this excludes a case where it is not necessary to perform the process for determining A.

The terms "system" and "apparatus" include not only a configuration in which multiple computers, hardware units, or apparatuses are connected by a communication unit, such as a network (including one-to-one communication connections), but also a configuration achieved by a single computer, a single hardware unit, or a single apparatus. The terms "apparatus" and "system" are used as terms with an equivalent meaning. The term "system" does not include the meaning of a social system, which is kind of a man-made agreement or arrangement.

In a case where processing is to be performed by each module or multiple kinds of processing are to be performed within a module, target information is read from the storage device for each processing, and the processed result is written into the storage device upon completion of the processing. Therefore, descriptions regarding the reading of information from the storage device before the processing and writing of information into the storage device after the processing are sometimes omitted. Examples of the storage device in this case may include a hard disk, a random access memory (RAM), an external storage medium, a storage device via a communication line, and a register within a central processing unit (CPU).

An information processing system according to the exemplary embodiment is configured to create a document based on information related to a client to be visited and includes a portable terminal 100 and a document management server 150, as shown in an example in FIG. 1. The term "client" refers to a client whom a representative having the portable terminal 100 may possibly visit, regardless of whether or not the representative may do business with the client. The term "visiting destination" refers to a client planned to be visited. The term "template (document template)" refers to a template for a document, which is to become one document by embedding attribute information into the template, where appropriate. The term "attribute information" refers to information of an attribute (and a set thereof) to be embedded into a template.

The portable terminal 100 and the document management server 150 are connected via a communication line 199. Therefore, the portable terminal 100 and the document management server 150 are communicable with each other. The communication line 199 may be of a wired type, a wireless type, or a combination of the two.

The portable terminal 100 includes a current-position acquisition module 105, a visiting-destination determination module 110, a visiting-destination database (DB) 115, a schedule DB 120, an attribute-deletion determination module 125, a transmission-information generating module 130, a template DB 135, an attribute DB 140, a document creation module 142, a command reception module 144, a display module 146, and a communication module 149.

The current-position acquisition module 105 is connected to the visiting-destination determination module 110. The current-position acquisition module 105 acquires the position of the portable terminal 100. For example, the current-position acquisition module 105 measures the latitude, the longitude, and the altitude, which are the current positional information, of the portable terminal 100 by using a global positioning system (GPS).

The visiting-destination determination module 110 is connected to the current-position acquisition module 105, the visiting-destination DB 115, the schedule DB 120, the attribute-deletion determination module 125, and the transmission-information generating module 130. The visiting-destination determination module 110 determines a client to be visited on the basis of the position acquired by the current-position acquisition module 105. Specifically, in order to create a document to be disclosed to the client, client-related information (i.e., attribute information) and a document template corresponding to the client are obtained. In order to obtain the client-related information and the document template, client identification (ID) of the client to be visited (i.e., information for uniquely identifying the client in accordance with the exemplary embodiment) is obtained. The visiting-destination determination module 110 determines the client ID. For example, information is retrieved from the visiting-destination DB 115 and the schedule DB 120 by using the position and the current time (i.e., the current year, month, date, seconds, or a combination thereof) obtained by the visiting-destination determination module 110 so that the client is determined. For example, if the client is located within a predetermined distance from the position acquired by the current-position acquisition module 105, the client is determined as the visiting destination. In other words, the visiting-destination determination module 110 determines the visiting destination from the current-position acquisition module 105 and the visiting-destination DB 115.

Alternatively, the visiting-destination determination module 110 may determine a client to be visited from among predetermined clients to be visited on the basis of the position acquired by the current-position acquisition module 105. For example, when the representative having the portable terminal 100 passes through an area near a client who is not to be visited this time, the portable terminal 100 makes excess communication if information of that client is acquired. This is not desirable from the standpoint of security. In order to suppress such excess communication and to achieve improved security, the following processing is performed. Specifically, processing for determining only a client planned to be visited during that time (i.e., the current time) from schedule information within the schedule DB 120 is performed. The expression "planned to be visited during that time" may include a schedule before and after the current time by a predetermined time period so as to cope with delays, tardiness, and the like.

The visiting-destination DB 115 is connected to the visiting-destination determination module 110. For example, the visiting-destination DB 115 stores the visiting destination or destinations to be visited today by the owner (i.e., representative) of the portable terminal 100 and the positional information of the destination or destinations. The visiting-destination DB 115 stores, for example, a visiting-destination table 900. The visiting-destination table 900 will be described later with reference to FIG. 9.

The schedule DB 120 is connected to the visiting-destination determination module 110. For example, the schedule DB 120 stores today's visit schedule. The schedule DB 120 stores, for example, a schedule table 1000. The schedule table 1000 will be described later with reference to FIG. 10.

The transmission-information generating module 130 is connected to the visiting-destination determination module 110, the template DB 135, the attribute DB 140, and the communication module 149. The transmission-information generating module 130 transmits the client ID determined by the visiting-destination determination module 110 and the document template stored within the template DB 135 in the portable terminal 100 to the document management server 150 via the communication module 149. The document template to be transmitted may be information indicating the type of document template. In other words, the transmission-information generating module 130 generates visiting-destination information (at least containing the client ID) and information containing the type of stored template, which are to be transmitted to the document management server 150.

The template DB 135 is connected to the transmission-information generating module 130, the document creation module 142, and the communication module 149. For example, the template DB 135 stores a template obtained from the document management server 150. The template DB 135 stores, for example, a template table 1100. The template table 1100 will be described later with reference to FIG. 11.

The attribute DB 140 is connected to the attribute-deletion determination module 125, the transmission-information generating module 130, the document creation module 142, and the communication module 149. For example, the attribute DB 140 stores attribute information obtained from the document management server 150. The attribute DB 140 stores, for example, an attribute table 1200. The attribute table 1200 will be described later with reference to FIG. 12.

The document creation module 142 is connected to the template DB 135, the attribute DB 140, the command reception module 144, and the display module 146. The document creation module 142 creates a document on the basis of the client-related information (i.e., client-related information within the attribute DB 140) received by the communication module 149 and the document template corresponding to the client within the template DB 135. The expression "on the basis of the client-related information and the document template" refers to applying the client-related information to the document template, which means embedding the client-related information into the document template.

The command reception module 144 is connected to the document creation module 142. The command reception module 144 detects an operation performed on a keyboard, a mouse, a touch-screen, or the like of the portable terminal 100 by an operator and receives a command for displaying the document corresponding to the client. Then, the command reception module 144 commands the document creation module 142 to create the document.

The display module 146 is connected to the document creation module 142. The display module 146 displays the document created by the document creation module 142 on, for example, a display or a projector of the portable terminal 100. In this case, outputting a print command to a printer is also included.

The communication module 149 is connected to the transmission-information generating module 130, the template DB 135, and the attribute DB 140. The communication module 149 exchanges data between the portable terminal 100 and the document management server 150. For example, the communication module 149 transmits information to the document management server 150 in accordance with a command from the transmission-information generating module 130 and makes the template DB 135 and the attribute DB 140 store information from the document management server 150. As a response to the transmission of information to the document management server 150 by the transmission-information generating module 130, the communication module 149 receives the client-related information from the document management server 150 or the client-related information and the document template corresponding to the client from the document management server 150. In this case, the information to be received is either the "client-related information" alone or "a combination of the client-related information and the document template corresponding to the client". Alternatively, information other than the above may be received. If the document template (i.e., the combination of the client-related information and the document template corresponding to the client) is received, the document template is stored in the template DB 135. The document template to be received is the document template itself, and a document is created by using the received document template. Furthermore, the client-related information may be stored in the attribute DB 140.

The attribute-deletion determination module 125 is connected to the visiting-destination determination module 110 and the attribute DB 140. Based on the position acquired by the current-position acquisition module 105, the attribute-deletion determination module 125 deletes the client-related information if the portable terminal 100 is distant from the client by a predetermined distance or more or if a second client different from that client is determined by the visiting-destination determination module 110. Specifically, when the visit to the client is finished, it is determined that the visit is finished based on the distance from the client or based on a visit to the next client. If the next client to be visited is located within a predetermined distance, the determination cannot be simply made based on the distance alone. Therefore, the determination is made based on whether the next client is visited. Furthermore, if the client-related information is stored in the attribute DB 140, the information is deleted from the attribute DB 140. In other words, the attribute-deletion determination module 125 determines currently-unnecessary attribute information from the current-position acquisition module 105 and the visiting-destination determination module 110 and deletes the information.

The document management server 150 includes a schedule management system 160, a document management system 170, and a communication module 189. Although the schedule management system 160 and the document management system 170 are provided within the document management server 150 in the example shown in FIG. 1, the two systems may alternatively be accommodated within independent housings and be connected via a communication line.

The schedule management system 160 includes a visit-schedule retrieval module 162, a client DB 164, and a schedule DB 166. The schedule management system 160 manages and retrieves a client visit schedule.

The visit-schedule retrieval module 162 is connected to the client DB 164, the schedule DB 166, and the communication module 189. The visit-schedule retrieval module 162 retrieves information corresponding to the portable terminal 100 from the client DB 164 and the schedule DB 166 on the basis of a command from the portable terminal 100 or when a predetermined time set within the schedule DB 166 is reached, and transmits the information to the portable terminal 100. For example, based on client information and the current time, the visit-schedule retrieval module 162 retrieves a visiting-destination list and visiting-destination positional information from the current time onward, and transmits the list and the positional information to the portable terminal 100.

The client DB 164 is connected to the visit-schedule retrieval module 162. For example, the client DB 164 stores client information and positional information thereof. The client DB 164 stores a client table 400. The client table 400 will be described later with reference to FIG. 4.

The schedule DB 166 is connected to the visit-schedule retrieval module 162. For example, the schedule DB 166 stores a client visit schedule. The schedule DB 166 stores a schedule table 500. The schedule table 500 will be described later with reference to FIG. 5.

The document management system 170 includes a transmission-information determination module 172, a template/attribute-information acquisition module 174, a template DB 176, and an attribute DB 178. The document management system 170 manages a document, a template, and attribute information for each client.

The template/attribute-information acquisition module 174 is connected to the transmission-information determination module 172, the template DB 176, the attribute DB 178, and the communication module 189. The template/attribute-information acquisition module 174 receives a client ID and a document template (i.e., the type of document template) stored in the template DB 135 of the portable terminal 100 from the portable terminal 100 via the communication module 189. Then, based on the information received from the portable terminal 100, the template/attribute-information acquisition module 174 acquires corresponding information (template/attribute information) from the template DB 176 and the attribute DB 178.

The transmission-information determination module 172 is connected to the template/attribute-information acquisition module 174 and the communication module 189. Based on the client ID, if a document template corresponding to that client is not stored in the template DB 135 of the portable terminal 100, the transmission-information determination module 172 transmits information related to that client and a document template thereof to the portable terminal 100 via the communication module 189. If the document template corresponding to that client is stored in the template DB 135 of the portable terminal 100, the transmission-information determination module 172 transmits the information related to that client to the portable terminal 100 via the communication module 189. In other words, the transmission-information determination module 172 determines information to be transmitted to the portable terminal 100 and transmits the information thereto.

The template DB 176 is connected to the template/attribute-information acquisition module 174. For example, the template DB 176 stores templates managed by the document management server 150. The template DB 176 stores, for example, a template table 600. The template table 600 will be described later with reference to FIG. 6.

The attribute DB 178 is connected to the template/attribute-information acquisition module 174. For example, the attribute DB 178 stores attribute information managed by the document management server 150. The attribute DB 178 stores an attribute table 700. The attribute table 700 will be described later with reference to FIG. 7.

The communication module 189 is connected to the visit-schedule retrieval module 162, the transmission-information determination module 172, and the template/attribute-information acquisition module 174. The communication module 189 exchanges data between the document management server 150 and the portable terminal 100. For example, the communication module 189 transmits information to the portable terminal 100 in accordance with a command from the visit-schedule retrieval module 162 or the transmission-information determination module 172 and forwards information from the portable terminal 100 to the visit-schedule retrieval module 162 or the template/attribute-information acquisition module 174.

Figure 2:
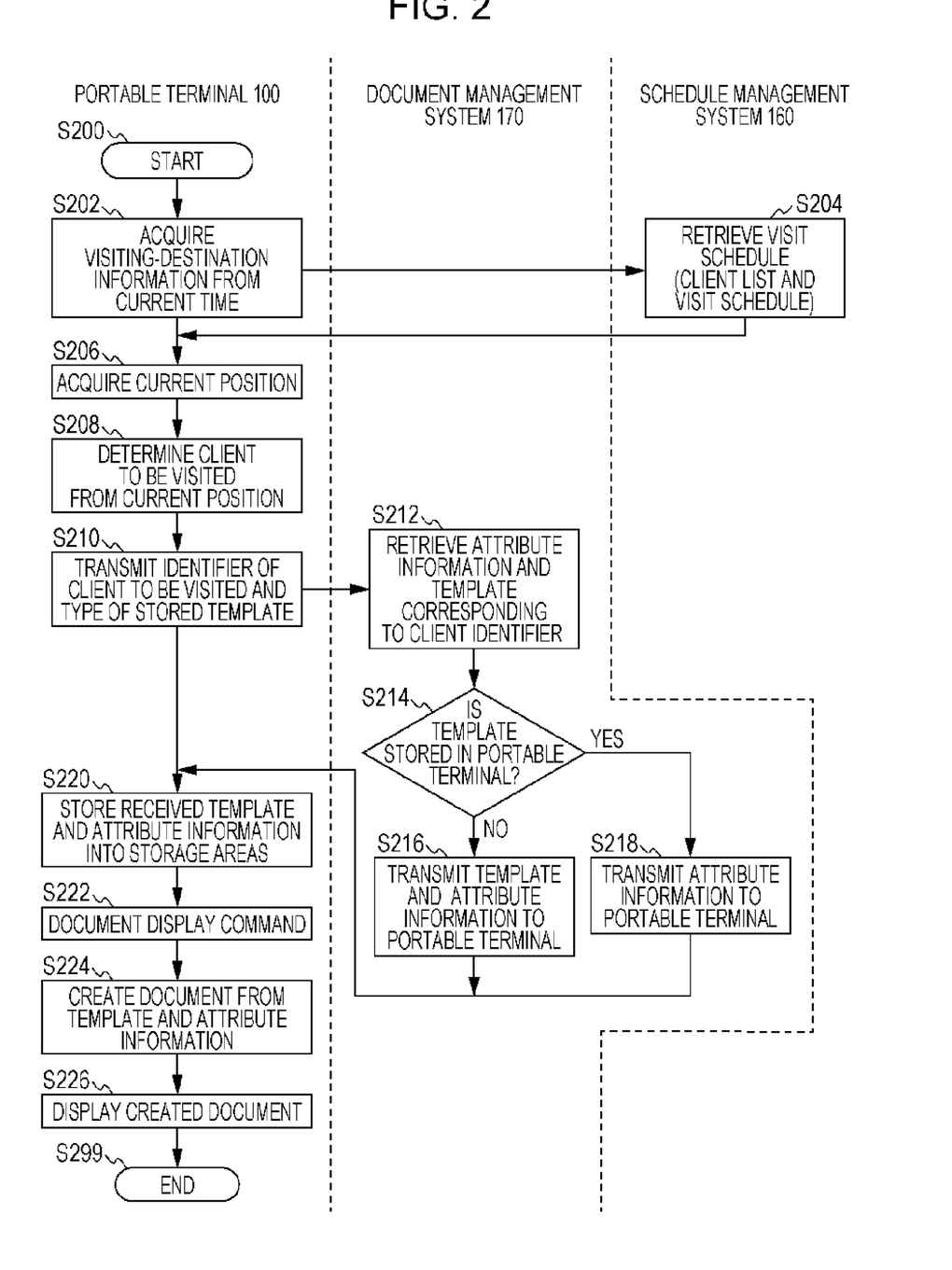
FIG. 2 is a flowchart illustrating an example of processing performed in the exemplary embodiment.

FIG. 2 is a flowchart illustrating an example of processing performed in the exemplary embodiment (i.e., in the portable terminal 100, the document management system 170, and the schedule management system 160).

In step S202, the transmission-information generating module 130 in the portable terminal 100 acquires visiting-destination information from the current time. Specifically, the transmission-information generating module 130 requests a planned-visit list and a visit schedule from the schedule management system 160.

In step S204, the visit-schedule retrieval module 162 in the schedule management system 160 retrieves the visit schedule (i.e., a client list and a visit schedule). Specifically, the visit schedule and the list of clients planned to be visited by the representative operating the portable terminal 100 are retrieved and transmitted thereto.

In step S206, the current-position acquisition module 105 in the portable terminal 100 acquires the current position.

In step S208, the visiting-destination determination module 110 in the portable terminal 100 determines a client to be visited from the current position.

In step S210, the transmission-information generating module 130 in the portable terminal 100 transmits the client ID of the visiting destination and the type of stored template. In other words, a document acquisition request is transmitted to the document management system 170.

In step S212, the template/attribute-information acquisition module 174 in the document management system 170 retrieves attribute information and a template corresponding to the client ID.

In step S214, the transmission-information determination module 172 in the document management system 170 determines whether or not the template is stored in the portable terminal 100. If stored, the processing proceeds to step S218. If not stored, the processing proceeds to step S216.

In step S216, the transmission-information determination module 172 in the document management system 170 transmits the template and the attribute information to the portable terminal 100.

In step S218, the transmission-information determination module 172 in the document management system 170 transmits the attribute information to the portable terminal 100. In other words, the template is not transmitted in this case.

In step S220, the communication module 149 in the portable terminal 100 stores the received template and the received attribute information in storage areas (i.e., the template DB 135 and the attribute DB 140).

In step S222, the command reception module 144 in the portable terminal 100 receives a document display command.

In step S224, the document creation module 142 in the portable terminal 100 creates a document from the template and the attribute information.

In step S226, the display module 146 in the portable terminal 100 displays the created document.

The portable terminal 100 updates the visiting-destination DB 115 in advance based on the current time.

If there are multiple visiting destinations, the visiting destinations are listed in the order of priority, and the user is allowed to make a selection. The order of priority is calculated on the basis of (1) the visit schedule, (2) the distance between the current position and the position of each visiting destination, and (3) the traveling direction of the portable terminal 100 (which is calculated based on a vector extending from the previous position to the current position).

Figure 3:
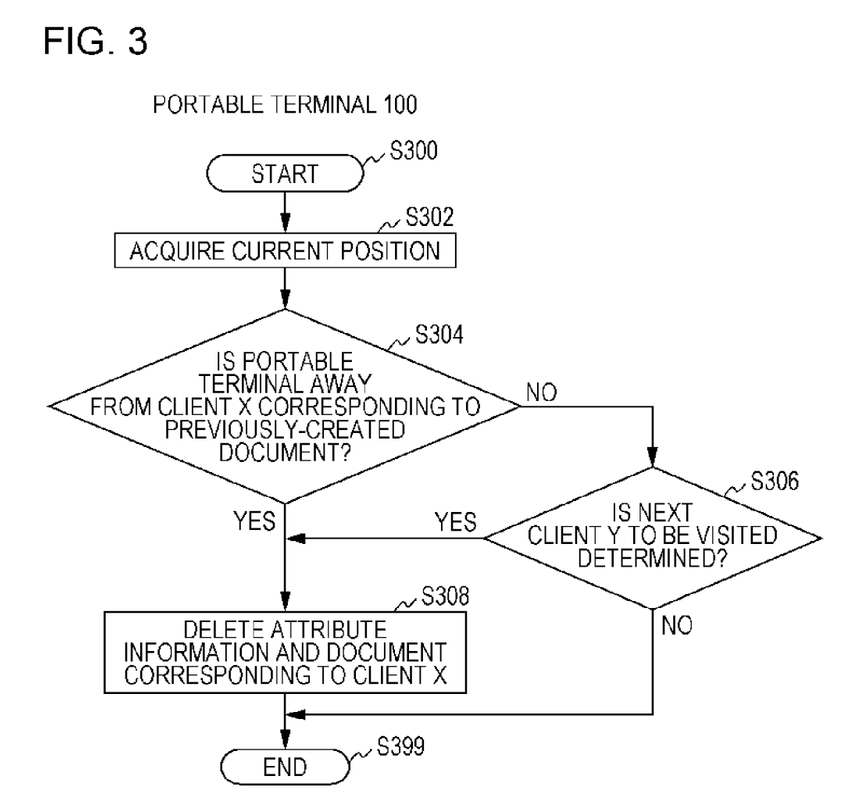
FIG. 3 is a flowchart illustrating an example of processing performed in the exemplary embodiment.

FIG. 3 is a flowchart illustrating an example of processing performed in the exemplary embodiment.

In step S302, the current-position acquisition module 105 acquires the current position.

In step S304, the attribute-deletion determination module 125 determines whether or not the portable terminal 100 has been moved away from a client X corresponding to a previously-created document. If yes, the processing proceeds to step S308. If not, the processing proceeds to step S306. Specifically, it is determined that the portable terminal 100 has been moved away from the client X if the distance between the client X and the current position is greater than or equal to a predetermined distance. In other cases, it is determined that the portable terminal 100 has not been moved away from the client X.

In step S306, the attribute-deletion determination module 125 determines whether or not a next client Y to be visited is determined. If yes, the processing proceeds to step S308. If not, the processing ends (step S399). The client determination process is performed similarly to that in step S208 shown in FIG. 2.

In step S308, the attribute-deletion determination module 125 deletes the document and the attribute information corresponding to the client X. With regard to the document created by the document creation module 142, if the document is to be simply displayed by embedding the attribute information to the template (i.e., if the embedding process is to be performed every time a created document is to be displayed, and the created document is not to be stored), the document may be left undeleted.

Figure 4:
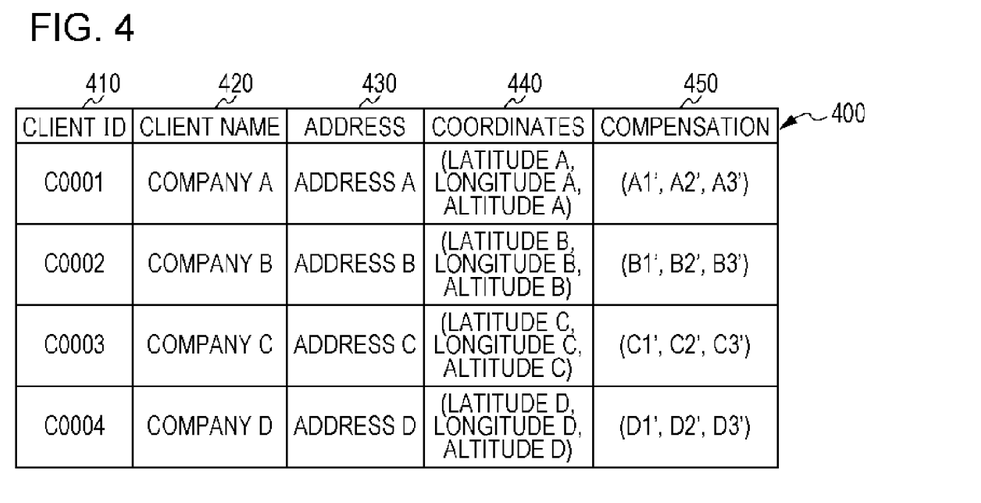
FIG. 4 illustrates a data structure example of a client table.

The client table 400 stored within the client DB 164 in the schedule management system 160 will now be described. FIG. 4 illustrates a data structure example of the client table 400. The client table 400 includes a client ID field 410, a client name field 420, an address field 430, a coordinate field 440, and a compensation field 450. The client ID field 410 stores client IDs. The client name field 420 stores client names of the clients. The address field 430 stores addresses of the clients. The coordinate field 440 stores the positions of the clients. The compensation field 450 stores positional compensation values. Accordingly, in addition to the addresses, the vicinity of each address is expressed by managing the coordinates (i.e., latitude, longitude, and altitude) and the compensation information (i.e., compensation 1, compensation 2, and compensation 3). Specifically, a client is determined based on whether or not the portable terminal 100 is located within the latitude±compensation 1, the longitude±compensation 2, and the altitude±compensation 3. The compensation values are values set for each portable terminal 100 or each client.

Figure 5:
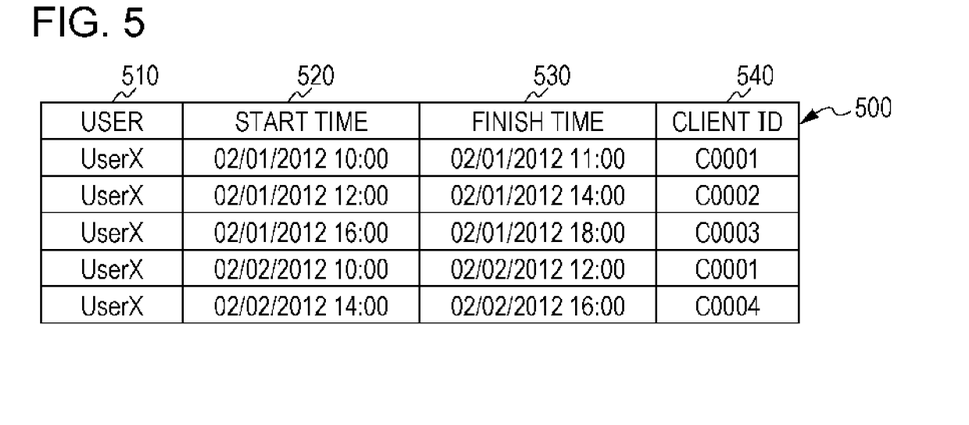
FIG. 5 illustrates a data structure example of a schedule table.

The schedule table 500 stored within the schedule DB 166 in the schedule management system 160 will now be described. FIG. 5 illustrates a data structure example of the schedule table 500. The schedule table 500 includes a user field 510, a start time field 520, a finish time field 530, and a client ID field 540. The user field 510 stores information (i.e., user ID) for uniquely identifying a representative according to the exemplary embodiment. In this case, the representative is in possession of the portable terminal 100. The start time field 520 stores the time and date at which the representative starts each visit in his/her schedule. The finish time field 530 stores the time and date at which each visit is finished. The client ID field 540 stores client IDs of visiting destinations.

Figure 6:
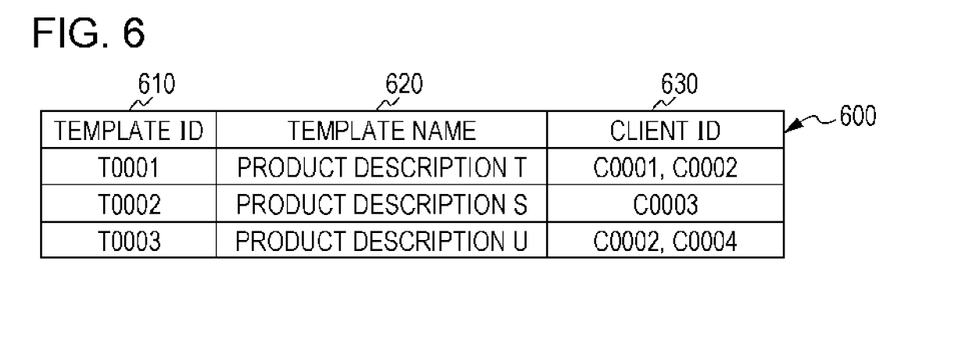
FIG. 6 illustrates a data structure example of a template table.

The template table 600 stored within the template DB 176 in the document management system 170 will now be described. FIG. 6 illustrates a data structure example of the template table 600. The template table 600 includes a template ID field 610, a template name field 620, and a client ID field 630. The template ID field 610 stores template IDs which are information for uniquely identifying templates according to the exemplary embodiment. The template name field 620 stores the names of the templates. The client ID field 630 stores client IDs of the clients for which the templates are used. By searching through the template table 600, a template corresponding to each client may be extracted.

Figure 7:
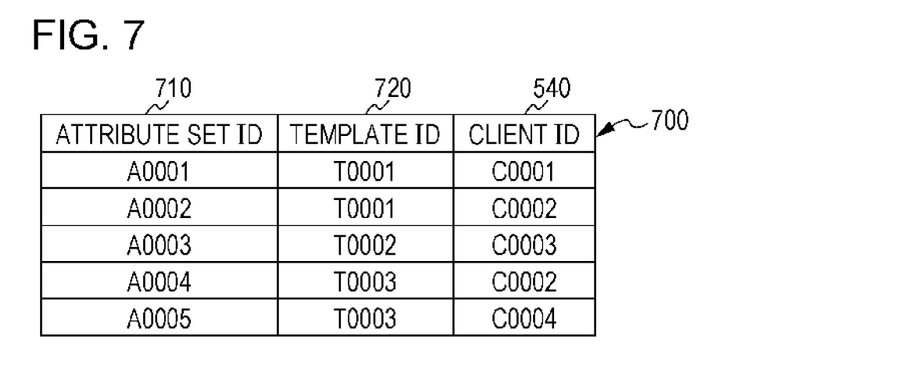
FIG. 7 illustrates a data structure example of an attribute table.

The attribute table 700 stored within the attribute DB 178 in the document management system 170 will now be described. FIG. 7 illustrates a data structure example of the attribute table 700. The attribute table 700 includes an attribute set ID field 710, a template ID field 720, and a client ID field 730. The attribute set ID field 710 stores attribute set IDs which are information for uniquely identifying attribute sets, which are attribute information corresponding to client IDs within the client ID field 730, according to the exemplary embodiment. The template ID field 720 stores template IDs of templates to which the attribute sets are applicable. The client ID field 730 stores client IDs. By searching through the attribute table 700, attribute information corresponding to each client may be extracted.

Figure 8:
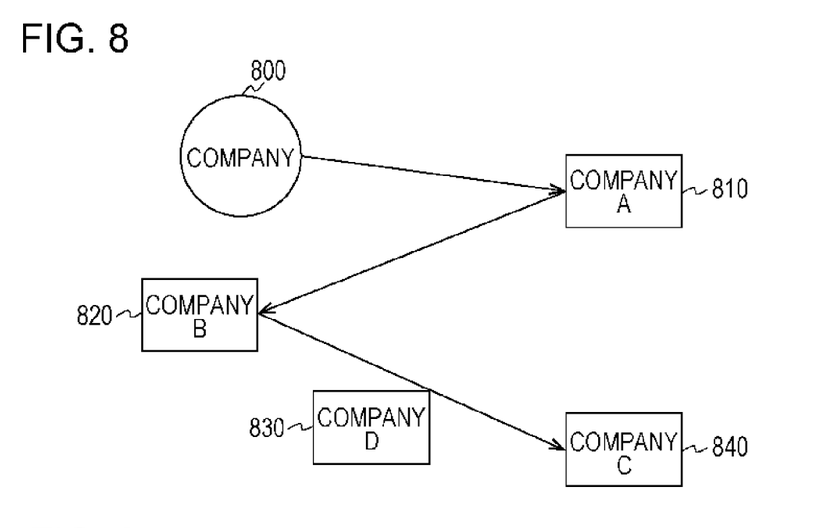
FIG. 8 illustrates an example of positional relationships among clients in the case where the exemplary embodiment is applied.

The following description relates to a specific example in which a user X visits clients on Feb. 1, 2012. FIG. 8 illustrates an example of positional relationships among the clients in the case where the exemplary embodiment is applied. According to the schedule for this day, company A 810, company B 820, and company C 840 are to be visited in that order by traveling from company 800 to company A 810, then to company B 820, and finally to company C 840. Although there is company D 830 between company B 820 and company C 840, company D 830 is not to be visited on this day.

With reference to the above case, the following description relates to the flow of how templates and attribute information are downloaded to the portable terminal 100.

(0) First, before making the visits, the clients to be visited today and the schedule are downloaded to the storage areas (i.e., the visiting-destination DB 115 and the schedule DB 120) in the portable terminal 100.

Figure 9:
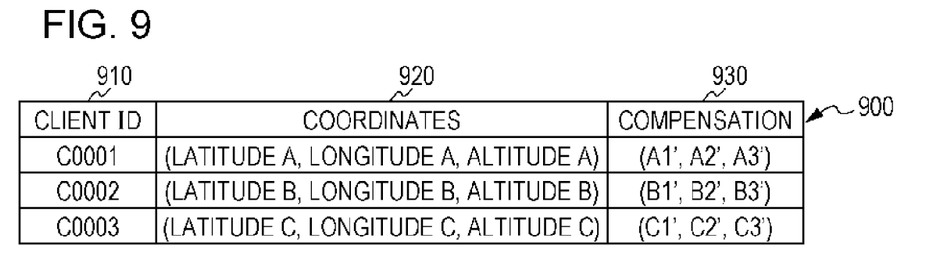
FIG. 9 illustrates a data structure example of a visiting-destination table.

The visiting-destination table 900 stored within the visiting-destination DB 115 in the portable terminal 100 will now be described. FIG. 9 illustrates a data structure example of the visiting-destination table 900. The visiting-destination table 900 includes a client ID field 910, a coordinate field 920, and a compensation field 930. The client ID field 910 stores client IDs. The coordinate field 920 stores the positions of the clients. The compensation field 930 stores positional compensation values. In other words, the visiting-destination table 900 corresponds to the client table 400 stored within the client DB 164 in the schedule management system 160. The coordinates (i.e., a portion of the contents of the client table 400) of the clients planned to be visited are downloaded and stored in advance (i.e., before making the visits on that day). The visit-schedule retrieval module 162 refers to the schedule table 500 so as to determine which client information is to be downloaded. Specifically, information of a user in possession of the portable terminal 100 receiving the download is retrieved from the user field 510 in the schedule table 500. Then, a client ID is extracted from the corresponding row of the client ID field 540. Subsequently, corresponding information is extracted from the client ID field 410, the coordinate field 440, and the compensation field 450 in the client table 400. The information is transmitted to the portable terminal 100 and is stored in the visiting-destination table 900 within the visiting-destination DB 115.

Figure 10:
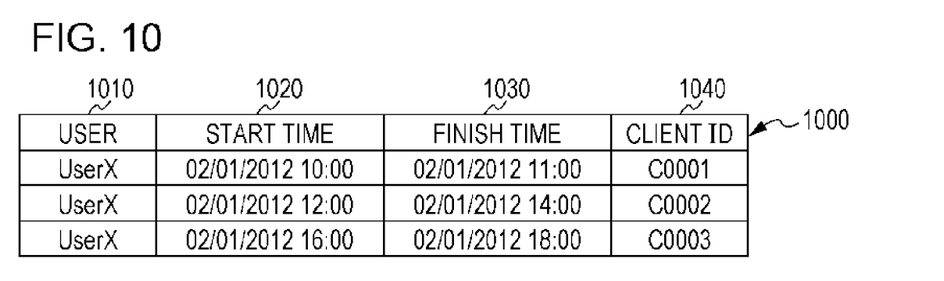
FIG. 10 illustrates a data structure example of a schedule table.

The schedule table 1000 stored within the schedule DB 120 in the portable terminal 100 will now be described. FIG. 10 illustrates a data structure example of the schedule table 1000. The schedule table 1000 includes a user field 1010, a start time field 1020, a finish time field 1030, and a client ID field 1040. The user field 1010 stores the user ID of the representative (in possession of the portable terminal 100). The start time field 1020 stores the time and date at which the representative starts each visit in his/her schedule. The finish time field 1030 stores the time and date at which each visit is finished. The client ID field 1040 stores client IDs to be visited. In other words, the schedule table 1000 corresponds to the schedule table 500 stored within the schedule DB 166 in the schedule management system 160. The visit schedule (i.e., the contents (or a portion thereof) of the schedule table 500) is downloaded and stored in advance (i.e., before making the visits on that day). Specifically, information of a user in possession of the portable terminal 100 receiving the download is retrieved from the user field 510 in the schedule table 500. Subsequently, information is extracted from the corresponding row of the start time field 520, the finish time field 530, and the client ID field 540. The information is transmitted to the portable terminal 100 and is stored in the schedule table 1000 within the schedule DB 120.

(1) Next, the user X visits company A 810 (C0001).

The current-position acquisition module 105 in the portable terminal 100 acquires the current position. When the visiting-destination determination module 110 determines that the portable terminal 100 is in the vicinity of company A 810 (C0001), a client ID (C0001) and a template (none) stored in the template DB 135 are transmitted to the document management system 170 (C0001, none). In response to this, the document management system 170 refers to the template table 600 and the attribute table 700 and transmits a template T0001 and an attribute set A0001 to the portable terminal 100.

Figure 11:
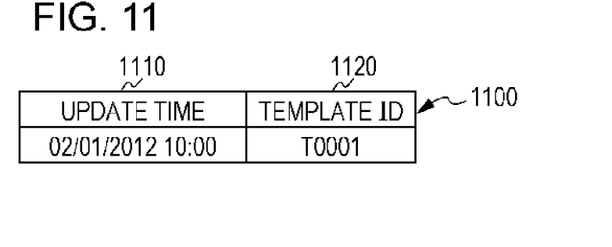
FIG. 11 illustrates a data structure example of a template table.

As a result, the template table 1100 within the template DB 135 and the attribute table 1200 within the attribute DB 140 are updated. FIG. 11 illustrates a data structure example of the template table 1100. The template table 1100 includes an update time field 1110 and a template ID field 1120. The update time field 1110 stores the time and date at which a template is downloaded. The template ID field 1120 stores a transmitted template ID. The template itself is stored in the template DB 135.

Figure 12:
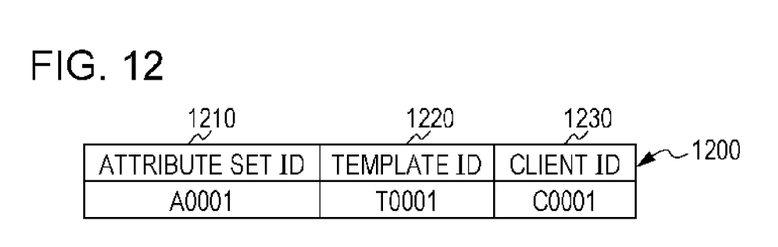
FIG. 12 illustrates a data structure example of an attribute table.

FIG. 12 illustrates a data structure example of the attribute table 1200. The attribute table 1200 includes an attribute set ID field 1210, a template ID field 1220, and a client ID field 1230. The attribute set ID field 1210 stores an attribute set ID. The template ID field 1220 stores a template ID of a template to which the attribute information is applied. The client ID field 1230 stores a client ID corresponding to the attribute information. The attribute information (A0001) itself of the user ID (C0001) is stored in the attribute DB 140.

(2) The user X visits company B 820 (C0002).

The current-position acquisition module 105 in the portable terminal 100 acquires the current position. When the attribute-deletion determination module 125 determines that the portable terminal 100 has been moved away from the vicinity of company A 810 (C0001), the attribute information (A0001) within the attribute DB 140 corresponding to company A 810 (C0001) is deleted.

When the current-position acquisition module 105 in the portable terminal 100 acquires the current position and the visiting-destination determination module 110 determines that the portable terminal 100 is in the vicinity of company B 820 (C0002), a client ID (C0002) and a template (T0001) stored in the template DB 135 are transmitted to the document management system 170 (C0002, T0001). In response to this, the document management system 170 refers to the template table 600 and the attribute table 700 and transmits a template 10003, an attribute set A0004, and an attribute set A0002 to the portable terminal 100.

Although templates corresponding to company B 820 are the templates T0001 and 10003, the template T0001 is not to be downloaded since it is already stored.

As a result, the template table 1100 within the template DB 135 and the attribute table 1200 within the attribute DB 140 are updated so that a template table 1300 and an attribute table 1400 are obtained, respectively.

Figure 13:
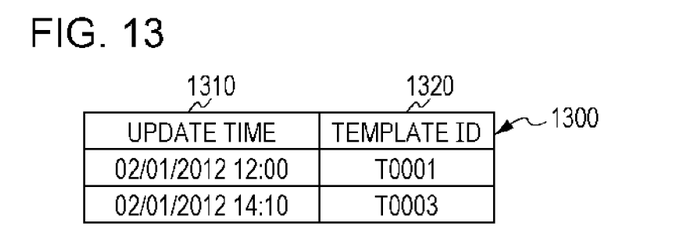
FIG. 13 illustrates a data structure example of a template table.

FIG. 13 illustrates a data structure example of the template table 1300, which is obtained as the result of updating the template table 1100. In other words, the template T0003 is added to the second row of the template table 1100, whereby the template table 1300 is obtained.

Figure 14:
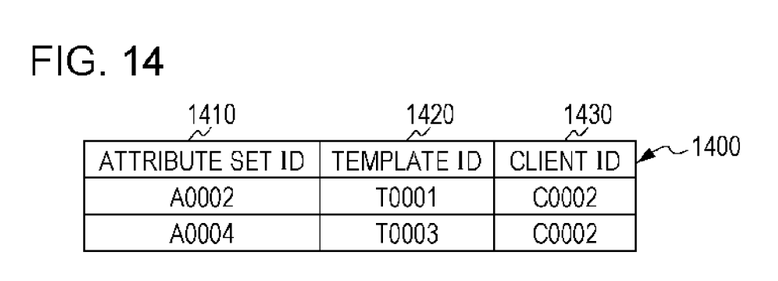
FIG. 14 illustrates a data structure example of an attribute table.

FIG. 14 illustrates a data structure example of the attribute table 1400, which is obtained as the result of updating the attribute table 1200. In other words, the attribute sets A0002 and A0004 are added to the first and second rows of the attribute table 1200, whereby the attribute table 1400 is obtained. The first row (i.e., the attribute set A0001) of the attribute table 1200 has been deleted at a point when it is determined that the portable terminal 100 has been moved away from company A 810.

(3) The user X passes through the vicinity of company D 830 (C0004) while visiting company C 840 (C0003) from company B 820.

When the current-position acquisition module 105 in the portable terminal 100 acquires the current position and the attribute-deletion determination module 125 determines that the portable terminal 100 has been moved away from the vicinity of company B 820 (C0002), the attribute sets A0002 and A0004 within the attribute DB 140 corresponding to company B 820 (C0002) are deleted.

Even if the portable terminal 100 acquires the current position in the vicinity of company D 830 (C0004), since company D 830 (C0004) does not exist in the visiting-destination DB 115 (i.e., the schedule table 1000), an inquiry to the document management system 170 is not made. In this case, the determination may be performed not only by simply determining that the client ID of the client in the vicinity does not exist within the schedule table 1000, but also by including the current time and date. Specifically, the current time and date may be acquired, and it may be determined whether or not the client ID of the client in the vicinity exists in schedule information within a predetermined range from (e.g., within ten minutes before and after) the current time and date.

(4) The user X visits company C 840 (C0003).

The current-position acquisition module 105 in the portable terminal 100 acquires the current position. When it is determined that the portable terminal 100 is in the vicinity of company C 840 (C0003), a client ID (C0003) and templates (T0001 and T0003) stored in the template DB 135 are transmitted to the document management system 170 (C0003, (T0001, T0003)). In response to this, the document management system 170 refers to the template table 600 and the attribute table 700 and transmits a template 10002 and an attribute set A0003 to the portable terminal 100.

As a result, the template table 1300 within the template DB 135 and the attribute table 1400 within the attribute DB 140 are updated so that a template table 1500 and an attribute table 1600 are obtained, respectively.

Figure 15:
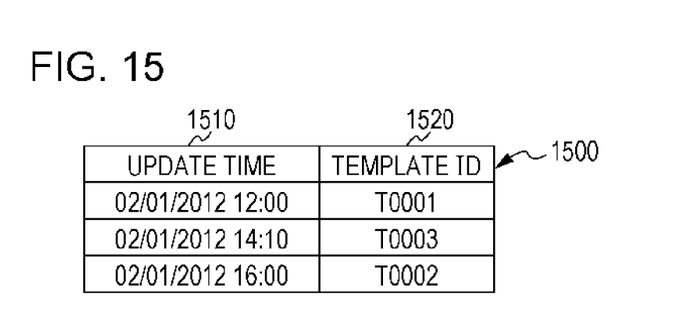
FIG. 15 illustrates a data structure example of a template table.

FIG. 15 illustrates a data structure example of the template table 1500, which is obtained as the result of updating the template table 1300. In other words, the template T0002 is added to the third row of the template table 1300, whereby the template table 1500 is obtained.

Figure 16:
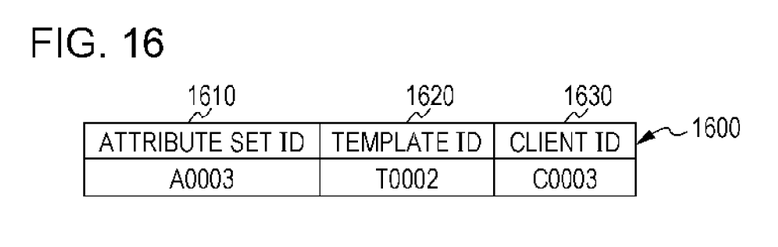
FIG. 16 illustrates a data structure example of an attribute table.

FIG. 16 illustrates a data structure example of the attribute table 1600, which is obtained as the result of updating the attribute table 1400. In other words, the attribute set A0003 is added to the first row of the attribute table 1400, whereby the attribute table 1600 is obtained. The first and second rows (i.e., the attribute sets A0002 and A0004) of the attribute table 1400 have been deleted at a point when it is determined that the portable terminal 100 has been moved away from company B 820.

Figure 17:
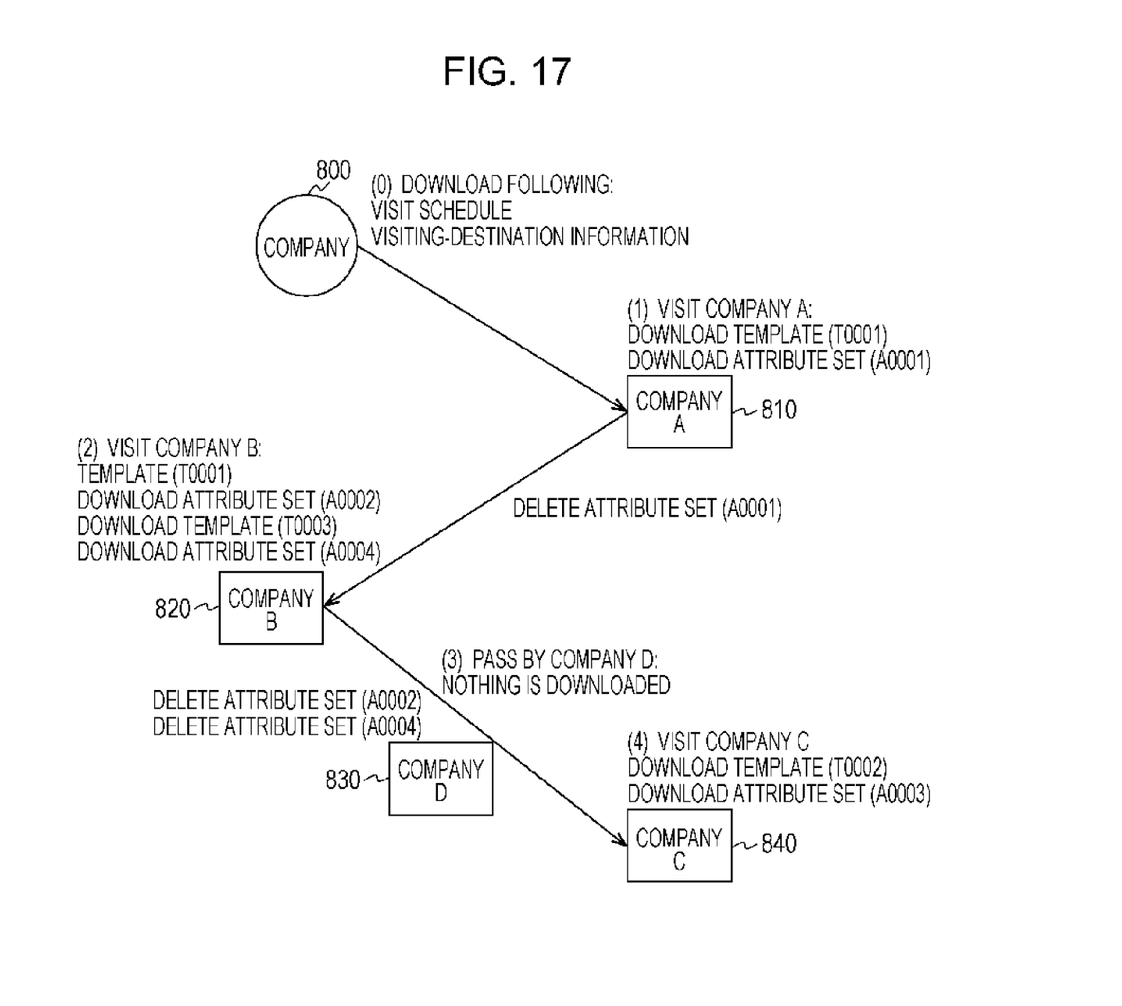
FIG. 17 illustrates an example of processing performed in the exemplary embodiment.

The downloading and the deletion of the templates and the attribute sets in the aforementioned visits will be described below with reference to an example shown in FIG. 17.

(0) At company 800, the visit schedule and the visiting-destination information are downloaded.

(1) By visiting company A 810, the template (T0001) and the attribute set (A0001) are downloaded.

While traveling from company A 810 to company B 820, the attribute set (A0001) is deleted.

(2) By visiting company B 820, the attribute set (A0002), the template (T0003), and the attribute set (A0004) are downloaded. The template (T0001) is already stored. Therefore, the already-stored template (T0001) is not downloaded.

(3) While traveling from company B 820 to company C 840, the attribute set (A0002) and the attribute set (A0004) are deleted. Although company D 830 is passed, nothing is downloaded. In other words, nothing is downloaded at locations that are not planned to be visited.

(4) By visiting company C 840, the template (T0002) and the attribute set (A0003) are downloaded.

Figure 18:
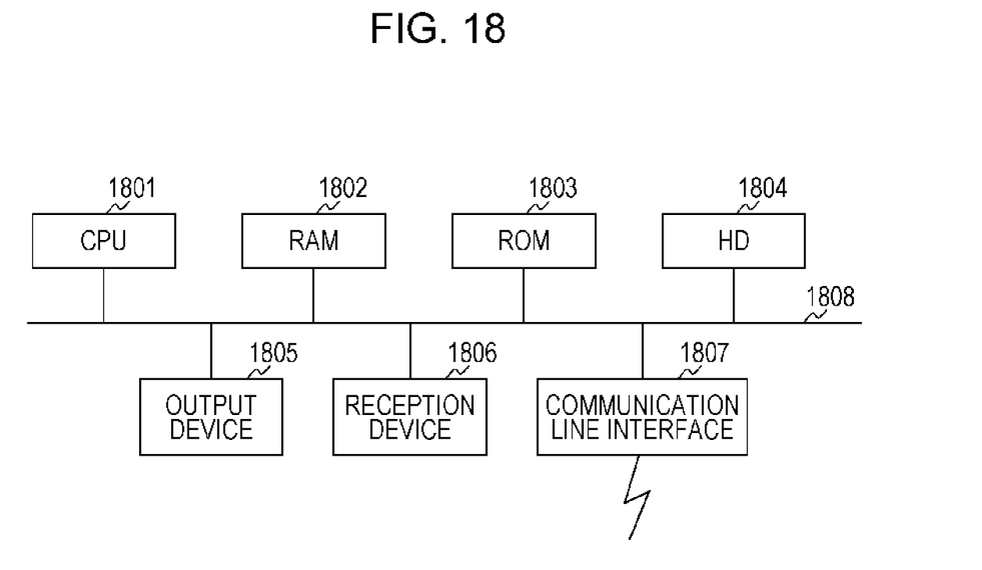
FIG. 18 is a block diagram illustrating an example of a hardware configuration of a computer that achieves the exemplary embodiment.

As shown in FIG. 18 as an example, a hardware configuration of a computer that executes a program according to the exemplary embodiment (i.e., the portable terminal 100, the document management server 150, the schedule management system 160, and the document management system 170) is a commonly-used computer, specifically, a personal computer or a computer that may serve as a server. The portable terminal 100 may be, for example, a portable telephone (including a smartphone), a notebook PC equipped with a communication function, or a portable tablet PC. As a detailed example, a CPU 1801 is used as a processing unit (i.e., an arithmetic unit), and a RAM 1802, a ROM 1803, and an HD 1804 are used as storage devices. The HD 1804 may be, for example, a hard disk. In the portable terminal 100, a memory card, for example, may be used in place of a hard disk. The portable terminal 100 is constituted of the CPU 1801 that executes a program for the current-position acquisition module 105, the visiting-destination determination module 110, the attribute-deletion determination module 125, the transmission-information generating module 130, the document creation module 142, the transmission-information determination module 172, the template/attribute-information acquisition module 174, and the visit-schedule retrieval module 162; the RAM 1802 that stores the program and data; the ROM 1803 that stores a program for activating the computer; the HD 1804 serving as an auxiliary storage device; a reception device 1806 (corresponding to the command reception module 144) that receives data based on an operation performed on a keyboard, a mouse, a button, a touch-screen, etc. by the user; an output device 1805 (corresponding to the display module 146), such as a liquid crystal display; a communication line interface 1807 (corresponding to the communication modules 149 and 189), such as a network interface card, for connecting to a communication network; and a bus 1808 that connects the above components so as to exchange data therebetween. Alternatively, multiple computers of the above type may be connected to each other via a network.

With regard to the computer program in the exemplary embodiment described above, a computer program, which is a software program, may be loaded into the system of the hardware configuration. The above exemplary embodiment is achieved by the software and hardware resources working in conjunction with each other.

The hardware configuration shown in FIG. 18 is one configuration example, and the exemplary embodiment is not limited to the configuration shown in FIG. 18. Any kind of hardware configuration is permissible so long as it is capable of implementing the modules described in the above exemplary embodiment. For example, some of the modules may be constituted of dedicated hardware units (such as application specific integrated circuits (ASICs)), some of the modules may be disposed within an external system and be connected via a communication line, and multiple systems of the type shown in FIG. 18 may be connected to each other via a communication line and operate in conjunction with each other.

The above-described program may be provided by being stored in a storage medium or may be provided via a communication unit. In that case, for example, the above-described program may be considered as a "non-transitory computer readable storage medium storing the program".

The term "non-transitory computer readable storage medium storing the program" refers to a non-transitory computer readable storage medium storing the program, which is used for, for example, installing, executing, and distributing the program.

Examples of the storage medium include a digital versatile disc (DVD), a compact disc (CD), a Blu-ray Disc (registered trademark), a magneto-optical disk (MO), a flexible disk (FD), magnetic tape, a hard disk, a read-only memory (ROM), an electrically erasable programmable read-only memory (EEPROM (registered trademark)), a flash memory, a random access memory (RAM), and a secure digital (SD) memory card. Examples of a DVD include a DVD-R, a DVD-RW, and a DVD-RAM, which are standards developed by DVD Forum, and a DVD+R and a DVD+RW, which are standards developed by DVD+RW Alliance. Examples of a CD include a compact disc read-only memory (CD-ROM), a compact disc recordable (CD-R), and a compact disc rewritable (CD-RW).

The aforementioned program or a part thereof may be stored in the storage medium for distribution or storage. Furthermore, the aforementioned program or a part thereof may be transmitted via a transmission medium, such as a wired network, a wireless network, or a combination of these networks, or may be transferred via a carrier wave. Examples of a wired network include a local area network (LAN), a metropolitan area network (MAN), a wide area network (WAN), the Internet, an intranet, and an extranet.

Furthermore, the aforementioned program may be a part of another program, or may be stored in a storage medium together with a different program. Moreover, the aforementioned program may be stored in segments in multiple storage media. The aforementioned program may be stored in any state, such as a compressed state or an encrypted state, so long as the program is recoverable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising an information processing apparatus and a portable information processing apparatus that are connected via a network,
   wherein the information processing apparatus includes
   a first reception unit that receives, from the portable information processing apparatus, client identification information and a type of document template stored in a storage device within the portable information processing apparatus, and
   a first transmission unit that transmits client-related information and a document template to the portable information processing apparatus if the type of document template corresponding to the client identification information is not stored in the storage device within the portable information processing apparatus, or transmits the client-related information to the portable information processing apparatus if the type of document template corresponding to the client identification information is stored in the storage device within the portable information processing apparatus, and
   wherein the portable information processing apparatus includes
   an acquisition unit that acquires a current position of the portable information processing apparatus,
   a determination unit that determines a first client to be visited and located within a predetermined distance from the current position acquired by the acquisition unit,
   a second transmission unit that transmits, to the information processing apparatus, information for identifying the first client determined by the determination unit and the type of document template stored in the storage device within the portable information processing apparatus,
   a second reception unit that receives information related to the first client from the information processing apparatus or the information related to the first client and a document template corresponding to the first client from the information processing apparatus in accordance with the transmission by the second transmission unit,
   a storage unit that stores the document template into the storage device if the document template is received by the second reception unit,
   a creation unit that creates a document based on the document template corresponding to the first client within the storage device and the information related to the first client received by the second reception unit, and
   a deletion unit that deletes the information related to the first client and the created document when the current position acquired by the acquisition unit is distant from a position of the first client by a predetermined distance or greater or when a second client to be visited, which is different from the first client, and located within a predetermined distance from the current position acquired by the acquisition unit is determined.

2. A portable information processing apparatus comprising:
   an acquisition unit that acquires a current position of the portable information processing apparatus;
   a determination unit that determines a first client to be visited and located within a predetermined distance from the current position acquired by the acquisition unit;
   a transmission unit that transmits, to an information processing apparatus, information for identifying the first client determined by the determination unit and a type of document template stored in a storage device within the portable information processing apparatus;
   a reception unit that receives information related to the first client from the information processing apparatus if a document template corresponding to the information for identifying the first client transmitted by the transmission unit is included in the transmitted type of document template, or receives the information related to the first client and a document template corresponding to the first client from the information processing apparatus if the document template corresponding to the information for identifying the first client transmitted by the transmission unit is not included in the transmitted type of document template;
   a storage unit that stores the document template into the storage device if the document template is received by the reception unit;
   a creation unit that creates a document based on the document template corresponding to the first client within the storage device and the information related to the first client received by the reception unit; and
   a deletion unit that deletes the information related to the first client and the created document when the current position acquired by the acquisition unit is distant from a position of the first client by a predetermined distance or greater or when a second client to be visited, which is different from the first client, and located within a predetermined distance from the current position acquired by the acquisition unit is determined; and
   wherein the determination unit determines a client to be visited from among a plurality of predetermined clients to be visited by using the current position acquired by the acquisition unit and schedule information of destinations to be visited by a user of the portable information processing apparatus.

3. An information processing method comprising:
   acquiring a current position of a portable information processing apparatus;
   determining a first client to be visited and located within a predetermined distance from the acquired current position;

transmitting information for identifying the determined first client and a type of document template stored in a storage device within the portable information processing apparatus to an information processing apparatus;

receiving information related to the first client from the information processing apparatus if a document template corresponding to the transmitted information for identifying the first client is included in the transmitted type of document template, or receiving the information related to the first client and a document template corresponding to the first client from the information processing apparatus if the document template corresponding to the transmitted information for identifying the first client is not included in the transmitted type of document template;

storing the document template into the storage device if the document template is received;

creating a document based on the document template corresponding to the first client within the storage device and the information related to the first client; and deleting the information related to the first client and the created document when the acquired current position is distant from a position of the first client by a predetermined distance or greater or when a second client to be visited, which is different from the first client, and located within a predetermined distance from the acquired current position is determined; and wherein the determining includes determining a client to be visited from among a plurality of predetermined clients to be visited by using the acquired current position and schedule information of destinations to be visited by a user of the portable information processing apparatus.

\* \* \* \* \*